United States Patent
Romanet et al.

(10) Patent No.: US 6,886,393 B1
(45) Date of Patent: May 3, 2005

(54) METHOD AND DEVICE FOR DETECTING DEPOSIT IN A CONDUIT

(75) Inventors: Thierry Romanet, La Penne s/Huveaume (FR); Jean-Luc Volle, Eaunes (FR); Jean Daniel Reber, Pertuis (FR)

(73) Assignees: 01 dB Metravib, Limonest (FR); Institut Francais du Petrole, Rueil Malmaison (FR)

( * ) Notice: Subject to any disclaimer, the term of this patent is extended or adjusted under 35 U.S.C. 154(b) by 0 days.

(21) Appl. No.: 10/088,534

(22) PCT Filed: Sep. 27, 2000

(86) PCT No.: PCT/FR00/02670
§ 371 (c)(1),
(2), (4) Date: Jun. 28, 2002

(87) PCT Pub. No.: WO01/25680
PCT Pub. Date: Apr. 12, 2001

(30) Foreign Application Priority Data

Oct. 1, 1999 (FR) .......................................... 99 12531

(51) Int. Cl.[7] .............................................. G01N 25/00
(52) U.S. Cl. .......................................... 73/61.62; 374/7
(58) Field of Search .......................... 73/53.01, 61.62; 122/379; 374/7, 13, 43, 44

(56) References Cited

U.S. PATENT DOCUMENTS

| 2,404,474 A | * | 7/1946 | Collins ........................... 374/7 |
| 3,229,499 A | * | 1/1966 | Shayeson et al. ............. 374/43 |
| 3,413,474 A | * | 11/1968 | Freeh .............................. 374/7 |
| 3,913,378 A | * | 10/1975 | Hausler .......................... 374/7 |
| 4,024,751 A | * | 5/1977 | Potrzebowski ............... 374/43 |
| 4,383,438 A | * | 5/1983 | Eaton ......................... 73/61.62 |
| 4,543,528 A | * | 9/1985 | Baraona ..................... 324/262 |
| 4,599,975 A | * | 7/1986 | Reeve et al. ................. 122/379 |
| 4,693,302 A | * | 9/1987 | Dodds ........................... 165/46 |
| 4,718,774 A | * | 1/1988 | Slough ............................ 374/7 |
| 4,836,146 A | * | 6/1989 | Russell et al. ............... 122/379 |
| 5,174,654 A | * | 12/1992 | Droege ........................... 374/7 |
| 5,615,953 A | * | 4/1997 | Moskal ........................... 374/7 |
| 5,836,693 A |   | 11/1998 | Stulen et al. |
| 5,959,194 A | * | 9/1999 | Nenniger ................... 73/53.01 |
| 6,208,254 B1 | * | 3/2001 | McQueen et al. .......... 340/603 |
| 6,331,075 B1 | * | 12/2001 | Amer et al. .................. 374/44 |
| 6,402,369 B1 | * | 6/2002 | Ludington et al. ............ 374/13 |
| 6,499,876 B1 | * | 12/2002 | Baginksi et al. ............... 374/7 |

FOREIGN PATENT DOCUMENTS

| DE | 4335332 | | 4/1995 | |
| FR | 2754898 | | 4/1998 | |
| GB | 2203844 A | * | 10/1988 | .......... G01N/25/18 |
| JP | 07229865 A | * | 8/1995 | .......... G01N/25/18 |
| RU | 2099632 | * | 12/1997 | ............. F17D/3/00 |

* cited by examiner

Primary Examiner—Charles Garber
(74) Attorney, Agent, or Firm—Dennison, Schultz, Dougherty & MacDonald

(57) ABSTRACT

The invention relates to an installation for implementing a method for detecting a deposit (D) that might form inside a fluid transport pipe (2). According to the invention, the installation comprises:

- at least one production source (3) for producing a thermal gradient, the source being for mounting on an "active" zone (Za) of the outside surface of the pipe;
- at least one measurement sensor (7) for measuring heat flux, the sensor being for mounting on a zone (Zm) of the outside surface of the pipe situated relative to the active zone at a given distance in consideration of the length of the pipe; and
- control and monitoring means (5) connected to the production source (3) and to the measurement sensor (7), and adapted to detect when the heat flux corresponding at least in part to the applied thermal gradient and transmitted by the pipe exceeds a determined threshold indicative of the presence of a deposit inside the pipe.

12 Claims, 2 Drawing Sheets

METHOD AND DEVICE FOR DETECTING DEPOSIT IN A CONDUIT

FIELD OF THE INVENTION

The present invention relates to the field of detecting a deposit or a solid phase liable to form in a pipe for transporting a fluid, in the general sense.

A preferred application of the invention lies in avoiding the risks of clogging in fluid transport pipes, and in particular in pipes for transporting multiphase petroleum fluids.

It is known that such multiphase petroleum fluids can lead to the formation of a solid phase such as hydrates, paraffins, asphaltenes, or other mineral deposits. The solid phase can be deposited at one or more locations in the pipe, thereby reducing flow rate to such an extent as to disturb hydrocarbon transport completely.

Present economic circumstances are encouraging operating companies to significantly reduce investment and operating costs, in particular, by improved control and by seeking to eliminate any risk of such a solid phase being deposited, both in processing installations and in installations for transporting hydrocarbons.

DESCRIPTION OF RELATED ART

In an attempt to remedy the problem of such solid phase deposition inside a hydrocarbon transport pipe, provision is made to use preventative solutions, one of which consists in adding inhibitor additives suitable for transporting such hydrocarbons on a more or less systematic basis. Another technique consists in regularly performing scraping operations inside pipes as a precaution. Such techniques, which are often combined, are expensive and are not totally satisfactory, particular because of the difficulties involved in planning them. Thus, in the event of the operations of scraping and/or adding inhibitor agents being poorly planned, problems arise associated with:

production being lost by pipes becoming clogged;

safety, with the risk of accidents associated with a hydrate plug appearing, or failure of valves to operate, or with restarting units that have become blocked by high-paraffin crudes gelling; and with commercial markets being lost by failure to comply with sales contract conditions due to production being stopped.

Such preventative techniques are particularly expensive, given the lack of any real data concerning the quantity of deposit that has already formed inside a pipe, so scraping operations are performed at intervals that are very close together and/or inhibitor additives are added in quantities that are greater than necessary. In an attempt to remedy those drawbacks, studies have been undertaken in order to improve knowledge about the conditions under which solid phases (hydrates, paraffins, and asphaltenes) form within a multiphase flow. Those studies seek to develop models for predicting deposition profiles along a pipe, or indeed to improve inhibitor additives suitable for enabling "difficult" crudes to be transported.

Another type of technique that is presently poorly developed relates to seeking to measure the quantity of deposit that has formed inside a pipe. In an attempt to obtain a real measurement of the quantity of a deposit that might have formed inside a pipe, proposals have been made to install measuring equipment and internal inspection equipment inside a pipe, or to introduce such equipment into a pipe. However, such a technique necessarily disturbs flow, and it need not be capable of performing measurement continuously or of providing a measurement that is reliable. On the same lines, proposals have been made to measure the quantity of deposit by means of ultrasound detectors. However it appears that the acoustic impedances of a deposit and of hydrocarbons being transported are substantially identical, so such a technique is not very reliable.

There thus exists a need for a technique making it possible, at selected points in the pipe, to detect a deposit or to measure the thickness of any such deposit that might be present inside a fluid transport pipe, regardless of whether the fluid is liquid and/or gaseous, with said technique not disturbing the flow and not being intrusive, while nevertheless being simple and effective.

SUMMARY OF THE INVENTION

To achieve such an object, the invention provides a method of detecting a deposit that might form inside a fluid transport pipe. The method of the invention consists:

in applying a thermal gradient to at least one "active" zone of the outside surface of the pipe;

in measuring the heat flux in at least one zone of the outside surface of the pipe that is situated at a given distance from the active zone in consideration of the length of the pipe; and in detecting when the heat flux corresponding at least in part to the applied thermal gradient and transmitted by the pipe exceeds a determined threshold indicative of the presence of a deposit inside the pipe.

In an advantageous implementation, the invention also seeks to determine the thickness of the deposit by comparing the measured heat flux with the heat flux measured during a calibration stage.

The invention also seeks to provide an installation for implementing the method of detecting a deposit that might form inside a fluid transport pipe. According to the invention, the installation comprises:

at least one production source for producing a thermal gradient, the source being for mounting on an "active" zone of the outside surface of the pipe;

at least one measurement sensor for measuring heat flux, the sensor being for mounting on a zone of the outside surface of the pipe situated relative to the active zone at a given distance in consideration of the length of the pipe; and control and monitoring means connected to the production source and to the measurement sensor, and adapted to detect when the heat flux corresponding at least in part to the applied thermal gradient and transmitted by the pipe exceeds a determined threshold indicative of the presence of a deposit inside the pipe.

Various other characteristics appear from the following description made with reference to the accompanying drawings which show embodiments and implementations of the invention as non-limiting examples.

DESCRIPTION OF PREFERRED EMBODIMENTS

Figure 1:
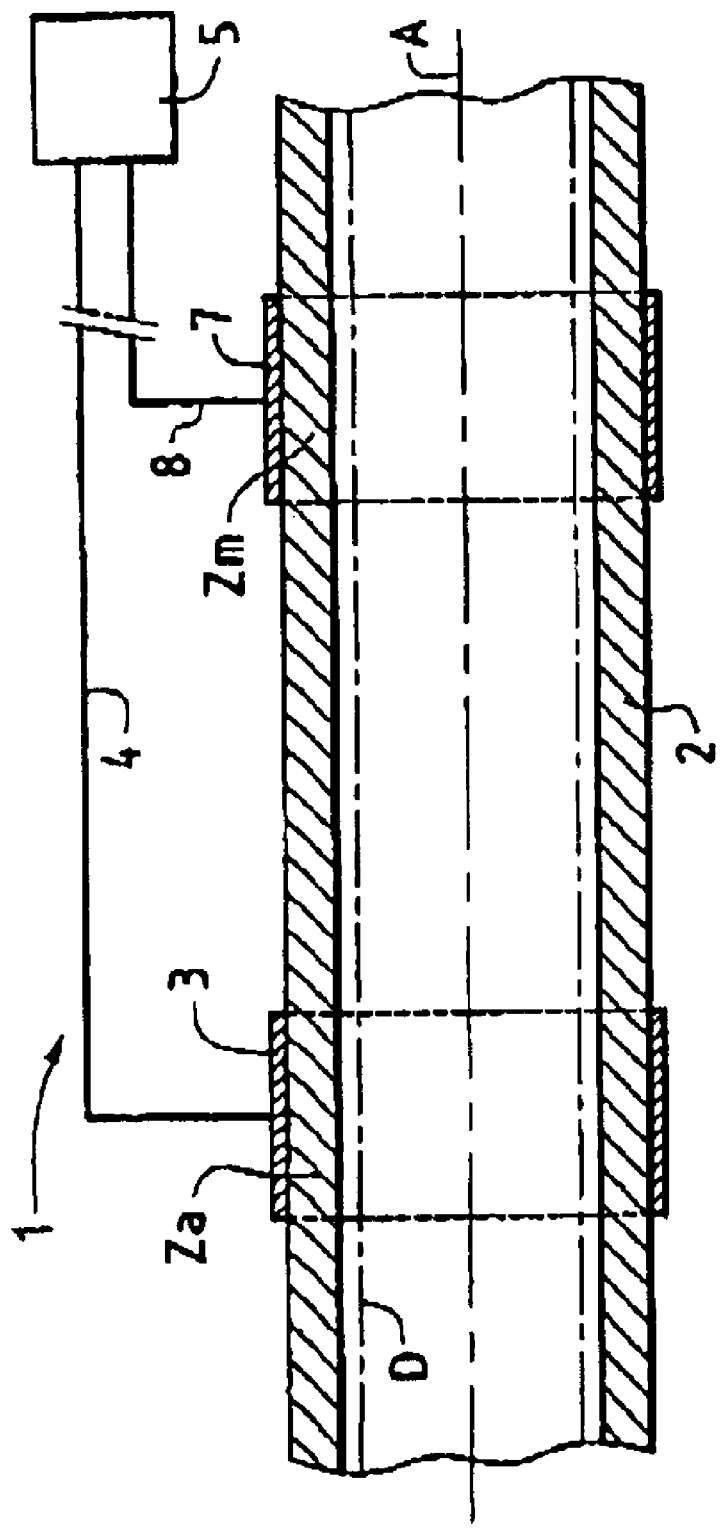
FIG. 1 is a diagrammatic view showing an embodiment of a detection installation in accordance with the invention.

As can be seen more clearly in FIG. 1, the installation 1 of the invention is adapted to detect a deposit, in the general sense, that might form inside a fluid transport pipe 2, in particular a petroleum transport pipe. In conventional manner, transporting multiphase petroleum fluids runs the risk of forming a deposit or a solid phase such as hydrates, paraffins, asphaltenes, or mineral deposits inside the pipe, as represented diagrammatically by reference D.

In accordance with the invention, the installation 1 has at least one source 3 for producing a thermal gradient G. Such a production source 3 is for mounting in an "active" zone Za of the outside surface of the pipe 2. It should be considered that the source 3 delivers or extracts a determined quantity of heat over a selected zone of the pipe 2 by any suitable means. By way of example, the quantity of heat delivered to the pipe 2 can be produced by the Joule effect, the Pelletier effect, or the Seebeck effect. In an embodiment, the source 3 for producing a thermal gradient can be constituted in the form of a flexible band including technical means for applying the thermal gradient. Such a band can either be fitted onto the pipe 2 beneath the thermal lagging or coating that generally surrounds petroleum product transport pipes, or else it can be integrated directly on the pipe while it is being manufactured.

Figure 2:
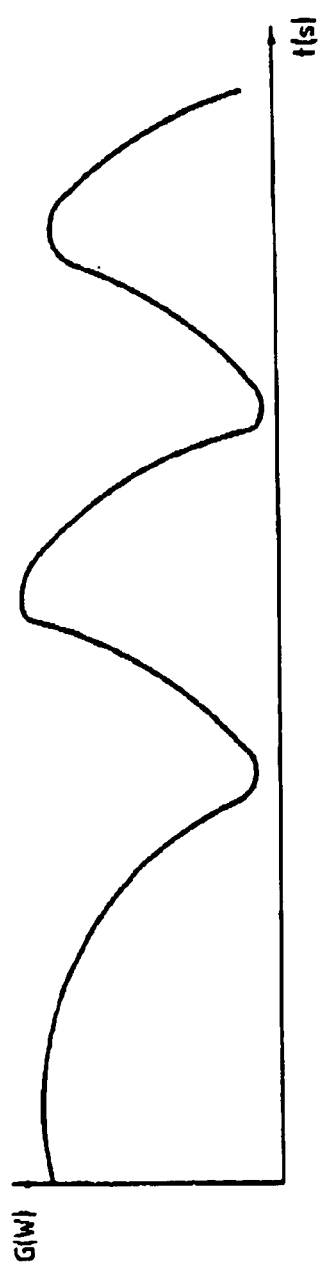
FIG. 2 is a curve showing the applied thermal gradient as a function of time.

The production source 3 is connected via a link 4 to control and processing means 5 adapted to control the quantity of heat applied and the length of time it is applied. In an embodiment shown more particularly in FIG. 2, the temperature gradient G is applied in an optionally regular determined cycle having periods during which the thermal gradient is applied interleaved with periods during which a zero or an opposite-sign thermal gradient is applied.

It should also be considered that the thermal gradient G is applied over an active zone Za of the pipe 2 of greater or lesser extent in the length direction of the pipe. In like manner, this active zone Za can constitute the entire circumference of the pipe 2. Naturally, particularly with pipes of large diameter, provision could be made to apply the thermal gradient over a plurality of determined angular sectors of a circumference of the pipe.

The installation 1 of the invention also comprises at least one sensor 7 for measuring heat flux F and designed to be mounted on a zone Zm of the outside surface of the pipe 2 that is situated at a given distance from the active zone Za in the length direction of the pipe 2. This "measurement" zone Zm for measuring heat flux is thus situated at a determined distance from the active zone Za along the longitudinal axis A of such a pipe 2. In other words, the production source 3 and the measurement sensor 7 are situated on two different right cross-sections of the pipe 2. It should be observed that the measurement sensor 7 can be installed upstream or downstream from the source 3 relative to the direction in which the fluid flows inside the pipe 2.

The heat flux measurement sensor 7 is mounted so as to measure heat exchange (i.e. in watts per square centimeter ($W/cm^2$)) between the pipe 2 and the fluid flowing inside the pipe. It should be observed that the measurement sensor 7 is adapted to be thermally transparent insofar as deposition problems are intimately related to temperature values measured at the periphery of the pipe 2. In other words, the measurement sensor 7 is designed to avoid locally modifying the temperature profile outside the pipe 2. Furthermore, given the fact that crude oil transport pipes 2 are generally thermally isolated by lagging or coating, such a measurement sensor 7 is installed beneath such lagging, so as to avoid altering the thermal environment of the pipe.

In an embodiment, such a sensor 7 for measuring heat flux is constituted by a flexible band such as a neoprene band having one or more flux meters mounted thereon so as to be distributed around the circumference of the pipe. When a flux meter is mounted on a given sector of the pipe, it can measure the heat exchange between the fluid being transported and said zone of the pipe. Such a band can either be fitted onto the pipe 2 beneath the thermally insulating lagging, or else can be integrated directly in the pipe during manufacture thereof. Such a measurement sensor 7 can also include a probe for measuring the outside surface temperature of the pipe 2.

The measurement sensor 7 is connected to the control and processor means 5 via a link 8 of any type. The control and processor means 5 are adapted as a function of the applied thermal gradient and of the measured heat flux to determine whether a deposit D is present inside the pipe 2, using the method described below.

The installation 1 described above is used as follows.

The control and processor means 5 use the source 3 to apply a thermal gradient G to the active zone Za of the pipe 2. The applied thermal gradient G is controlled both in power and in time so as to be identifiable compared with any thermal variations that might be due to the environment outside the pipe or to the fluid it is transporting. In particular, the applied thermal gradient takes account of the distance between the source 3 and the measurement sensor 7. By way of example, the thermal gradient is applied cyclically. An example showing one possible form of applied thermal gradient G is given in FIG. 2.

Figure 3:
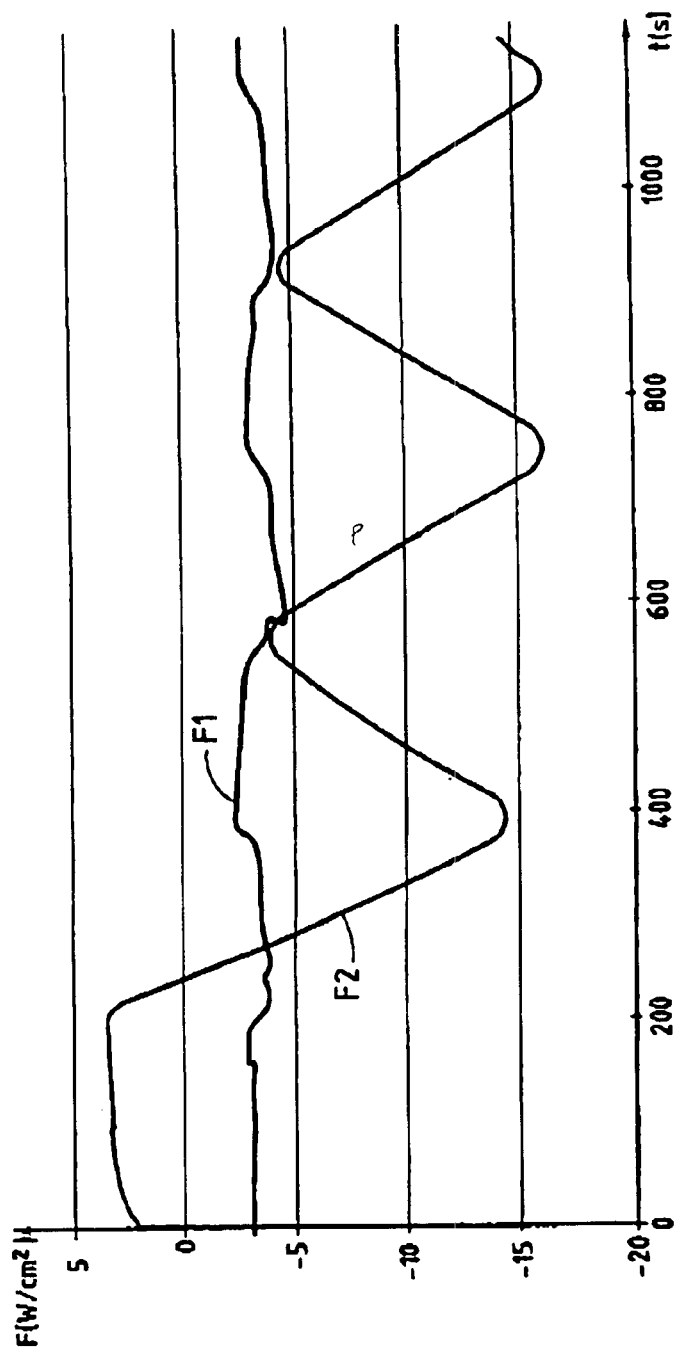
FIG. 3 is a curve showing the measured heat flux signal as a function of time in the presence and in the absence of a deposit inside the pipe.

At least after the thermal gradient G has been applied, the control and processor means 5 use the sensor 7 to measure the heat flux in a zone Zm of the outside surface that is situated at a distance from the active zone Za. In the absence of any deposit inside the pipe 2, the injected thermal gradient is transmitted almost in full to the fluid traveling along the pipe 2. Given the distance between the measurement sensor 7 and the source 3 producing the thermal gradient, the heat flux detected in the measurement zone Zm is practically unmeasurable. An example of a heat flux signal $F_1$ for a pipe 2 having no deposit is shown in FIG. 3.

When a deposit D is present inside the pipe 2, the deposit provides thermal insulation between the pipe 2 and the transported fluid. The thermal gradient injected via the active zone Za is not transmitted to the fluid but is transmitted mainly into the structure of the pipe 2 itself. The heat flux is thus transmitted to the measurement zone Zm of the measurement sensor 7. An example of the heat flux signal $F_2$ as measured when a deposit D is present inside the pipe is shown in FIG. 3. This measured thermal gradient corresponds, at least in part, to that applied and transmitted by the pipe 2.

The value of the measured heat flux is compared with a determined threshold value representative of the presence of a deposit D inside the pipe 2. If the measured heat flux value reaches or exceeds this threshold value, then the control and processor means 5 indicate the presence of such a deposit by any appropriate means, e.g. in the form of a chart, an audible signal, and/or a light signal, a message, etc.

The method of the invention thus seeks to apply a thermal gradient to at least one outside surface zone of the pipe and to measure the heat flux at a given distance from the application zone, at least while said thermal gradient is being applied, thereby determining whether the heat is diffused into the fluid (no deposit), or is transmitted by the pipe (a deposit is present which acts as thermal insulation). Thus, when a deposit D is present, there exists a correlation between the application of a thermal gradient and the appearance of a heat flux at a given distance from the point of application. It should be observed that using a series of flux meters, each associated with a respective sector of the circumference of the pipe, makes it possible to obtain measurements which take account of various different flow regimes that can occur for a fluid that comprises a liquid phase and a gaseous phase. In addition, using a plurality of spaced-apart flux meters makes it possible to detect the presence of a deposit for each of the measurement zones associated with a respective flux meter.

In an advantageous embodiment, the subject matter of the invention also makes it possible to determine the thickness of such a deposit D by comparing the measured heat flux with the heat flux measured during a calibration stage. In a particular embodiment, the peak values of the measured heat flux can be detected so as to enable the peak-to-peak value of the signal to be compared with the threshold value indicating that a deposit is present inside the pipe.

PERCEPTIBILITY OF INDUSTRIAL APPLICATION

The subject matter of the invention thus makes it possible to detect the presence of a solid phase or a deposit inside a pipe, and also to measure the thickness of such a deposit. Such detection or measurement can be performed easily by mounting the measurement sensor 7 and the heat production source on various types of flexible or rigid pipe, and doing so in an integrated manner or in a fitted-on manner. Such mounting can be applied to fluid transport pipes, in particular to off-shore pipes located at great depths. Naturally, the control and processor means 5 can easily be at a distance from the pipe 2 by using links 4, 8. Furthermore, such an installation can be combined with another technique for measuring the quantity of a deposit, e.g. a vibratory technique as explained in patent application FR 2 754 898.

The invention is not limited to the embodiments described and shown, since numerous modifications can be made thereto without going beyond its ambit.

What is claimed is:

1. A method of detecting a deposit (D) having a thermally insulating nature inside a fluid transport pipe (2) through which fluid is flowing, and which comprises a pipe wall having an outside surface, the deposit thermally insulating the pipe wall from fluid being transported by the pipe, the method comprising:
    applying a thermal gradient (G) to the outside surface of the pipe, the thermal gradient being transmitted substantially to the pipe wall when an insulating deposit is present;
    measuring the heat flux (F) on the outside surface of the pipe at a given distance from the application of the heat flux along the length of the pipe;
    determining a threshold value for heat flux at the given distance indicative of the presence of an insulating deposit of predetermined thickness;
    detecting when the heat flux measured at the given distance exceeds the threshold value, indicating the presence of an insulating deposit inside the pipe; and
    applying a thermal gradient (G) in a determined cycle.

2. A method according to claim 1, comprising applying a thermal gradient (G) around a circumference of the pipe.

3. A method according to claim 1, comprising applying a thermal gradient (G) via a heat production source (3) fitted to or integrated in the pipe.

4. A method according to claim 1, comprising measuring the heat flux (F) at one or more sectors of a circumference of the pipe.

5. A method according to claim 1 comprising measuring the heat flux (F) by means of a heat flux sensor (7) fitted to or integrated in the pipe.

6. A method according to claim 1, comprising determining the thickness of the deposit (D) by comparing the measured heat flux with the heat flux measured during a calibration stage.

7. An installation for detecting a deposit having a thermally insulating nature (D) inside a fluid transport pipe through which fluid is flowing, and which comprises a pipe wall and an outside surface, the deposit insulating the pipe wall from fluid flowing through the pipe, the installation comprising:
    at least one source for producing a thermal gradient (G) mounted on the outside surface of the pipe, the thermal gradient being transmitted in a determined cycle and substantially to the pipe wall when the thermally insulating deposit is present;
    at least one measurement sensor for measuring heat flux (F) mounted on the outside surface of the pipe situated at a given longitudinal distance from the active zone source; and
    control and monitoring means connected to the production source and to the measurement sensor adapted to determine a threshold value for the heat flux at the given distance indicative of the presence of an insulating deposit of predetermined thickness inside the pipe, and to detect when the heat flux measured at the given distance exceeds a the threshold value indicative of the presence of an insulating deposit inside the pipe.

8. An installation according to claim 7, wherein the monitoring means (5) comprises means for determining the thickness of the deposit by comparing the measured heat flux and the heat flux measured during a calibration stage.

9. An installation according to claim 7, wherein the control and monitoring means (5) comprise means for detecting peak values of a measured heat flux signal so that the peak-to-peak value of the signal can be compared with the threshold value indicating the presence of a deposit inside the pipe.

10. An installation according to claim 7, wherein the production source (3) for producing a heat gradient is constituted in the form of a flexible band fitted to or integrated in the pipe.

11. An installation according to claim 7, wherein the measurement sensor for measuring heat flux (7) is formed by a flexible band equipped with one or more flux meters and fitted to or integrated in the pipe.

12. A method of detecting a deposit (D) having a thermally insulating nature inside a fluid transport pipe (2) through which fluid is flowing, and which comprises a pipe wall having an outside surface, the deposit thermally insulating the pipe wall from fluid being transported by the pipe, the method comprising:
    applying a thermal gradient (G) to the outside surface o of the pipe in a predetermined cycle, the thermal gradient being transmitted substantially to the pipe wall when an insulating deposit is present;
    measuring the heat flux (F) on the outside surface of the pipe at a given distance from the application of the heat flux along the length of the pipe;
    comparing variations in the measured heat flux with variations in the predetermined cycle; and
    determining if a correlation between the variations in the predetermined cycle and the variations in the measured heat flux is sufficient to indicate the presence of a deposit inside the pipe.

* * * * *